INVENTOR.
THEODORE S. ROWE
ATTORNEY

United States Patent Office 3,498,623
Patented Mar. 3, 1970

3,498,623
GASKET
Theodore S. Rowe, Kent, Ohio, assignor to Hamilton Kent Manufacturing Co., Kent, Ohio, a corporation of Ohio
Filed Mar. 9, 1967, Ser. No. 621,900
Int. Cl. F16j 15/32
U.S. Cl. 277—206                                    5 Claims

ABSTRACT OF THE DISCLOSURE

A pipe gasket is composed of a base and two lips which extend lengthwise of the gasket. In coupling two pipe sections, the first lip to enter the union is referred to herein as the leading lip and the other is referred to as the second lip. The base is relatively incompressible along each edge and is hollow or otherwise easily compressible between the two lips. This easily compressible portion extends over the second lip the rear of which is hinged to the relatively in compressible rear edge of the base. When the leading lip is depressed against the easily compressible portion of the base, as the gasket is being squeezed between two pipes, the second lip is tilted forward from its backwardly leaning posture so that it stands erect. The base is preferably hollow under the leading lip to facilitate folding it against the easily compressed portion of the base.

---

The invention relates to a pipe gasket extruded from elastomeric material such as a rubber, etc.

The prior art includes many gaskets with lips and hollow or otherwise compressible bases, but the prior art is believed not to include any anticipation of the various elements cooperating to produce the novel effect which results from the use of the gasket of this invention.

The gasket of this invention includes a base and two lips, viz. a leading lip and a second lip. These lips extend lengthwise of the gasket which is cut into lengths. The ends of each length are eventually united to form an annular gasket. In locating the gasket between a bell and the male portion of a pipe, the leading lip and forward edge of the gasket are nearer the end of the male portion of the pipe than the second lip and the rear edge of the gasket. The second lip, and usually both lips are inclined away from the forward edge of the gasket toward the rear edge.

Both edges of the base are relatively incompressible. Between these is an easily compressed portion which extends from the leading lip under the second lip the rear of which is hinged to the relatively incompressible rear edge of the base.

The gasket is placed on the male end of a pipe with its front edge near the pipe end. As the bell of a second pipe contacts the leading lip of the gasket, as the pipes are telescoped, the leading lip is pressed backward against the easily compressed portion of the base. Pressure exerted on this portion of the base in this manner pulls the second lip which until then leans backward, to a more nearly erect position, and as the bell presses against the second lip this pressure on the easily compressed portion of the base maintains the second lip in permanent pressure-sealing contact with the bell.

The action of the leading lip in being folded against the easily compressed portion of the base is facilitated by providing a hollow under the leading lip. If the easily compressed portion of the base is hollow, the two hollows might be joined but they are preferably kept separate. It is not essential to provide a hollow under the leading lip because this lip may be so connected with the base that its top portion is hinged to its lower portion or otherwise constructed so that the upper portion can be bent into pressure contact with the easily compressed portion of the base without causing any substantial movement of the lower portion of the lip.

The invention is further described in connection with the accompanying drawings, in which—

Figure 1:
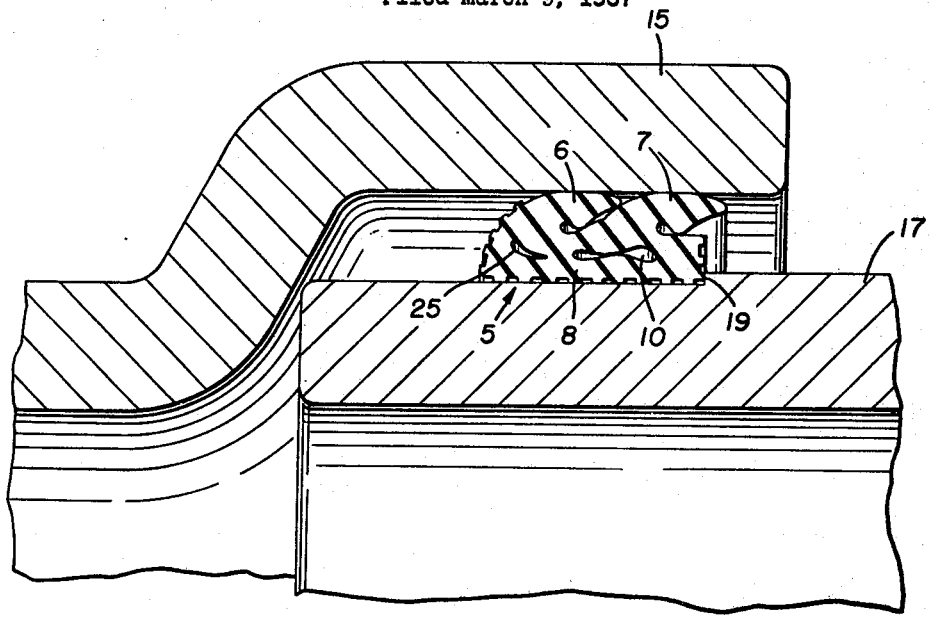
FIGURE 1 is a section through the finished joint with a gasket between the two pipe ends.
Figure 2:
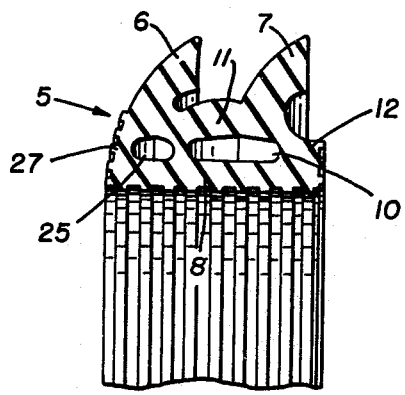
FIGURE 2 is a section through the gasket.

The gasket 5 comprises a leading lip 6, a second lip 7 and the hollow base 8. Instead of being hollow this portion of the base may be made easily compressible by honeycombing, etc. The hollow 10 extends away from the leading lip to a position somewhat over half the distance under the second lip. It extends at least to the rear of the leading lip. Thus the whole of the intermediate portion 11 is collapsible. The thick rear edge 12 of the base supports the rear of the second lip, as by a hinge, so that when pressure is applied to the base over the hollow 10, the second lip is drawn to the more erect position shown in FIGURE 3. This increases the pressure exerted by the second lip against the bell 15 of the telescoped pipe sections as shown in FIGURE 1. The male end 17 of the pipe may be of any usual design, and its end may be of reduced outer diameter to provide the abutment 19 which positions the gasket 5 on it.

To facilitate the collapse of the leading lip 6 as the bell of the pipe contacts it, as the two pipe portions are being telescope, the base under it is preferably hollowed out, as at 25. The thick front edge 27 of the base is wide enough to support the front of the lip 6 as it is being collapsed. The under surface of the gasket may be ribbed as shown, although this is not necessary.

Figure 3:
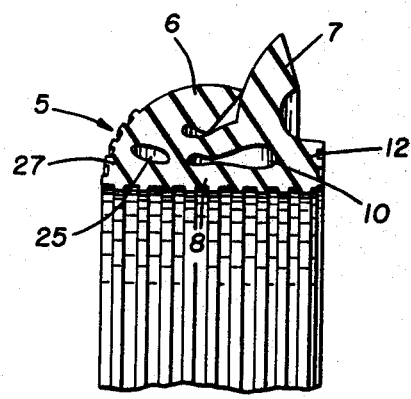
FIGURE 3 is a section through the gasket in the position it occupies at the end of a male pipe when the bell of a second pipe contacts only the gasket's leading lip.

After the gasket is compressed between the two pipe parts, as shown in FIGURE 1, the pressure of the leading lip against the base above the hollow continues, and tends to pull the second lip to the rect position shown in FIGURE 3, throughout the life of the pipe joint. This makes a tighter seal than if the lip 6 did not continually pull the lip 7 to the erect position.

The invention is covered in the claims which follow.

I claim:

1. An elongated, annular elastomeric pipe gasket of uniform cross section which comprises a base with a leading lip near its front edge and a second lip adjacent the leading lip and near the rear edge of the base, both lips being integral with the base, extending circumferentially of the gasket and leaning toward said rear edge, the front and rear edges of the base being relatively incompressible with an intermediate portion collapsible throughout its entire length, said intermediate portion extending from the relatively incompressible rear edge to at least the rear of the leading lip, said intermediate portion being relatively easily compressed, the second lip being hinged to the relatively incompressible rear edge of the base, the front portion of the second lip being attached to the rear of said intermediate portion of the base, an upper portion of the leading lip being lowerable against the intermediate portion of the base to compress a front portion of said intermediate portion when said leading lip is bent away from the front edge of the gasket whereby the second lip swings upward on said hinged connection due to such compression of the easily compressed portion of the base.

2. The gasket of claim 1 in which the easily compressible portion of the base is hollow.

3. The gasket of claim 1 in which the gasket is hollow under most of the leading lip to facilitate its compressing the easily compressed portion of the base when it is bent toward the rear of the gasket.

4. The gasket of claim 1 in which the easily compressed portion of the gasket is hollow and there is a separate hollow under most of the leading lip to facilitate its compressing the easily compressed portion of the base when it is bent toward the rear of the gasket.

5. The gasket of claim 1 in which the intermediate portion extends over half the distance under the second lip.

References Cited

UNITED STATES PATENTS

| | | |
|---|---|---|
| 2,615,741 | 10/1952 | Nathan. |
| 3,046,028 | 7/1962 | Nathan. |
| 3,386,745 | 6/1968 | Hein _____ 277—209 X |

LAVERNE D. GEIGER, Primary Examiner

U.S. Cl. X.R.

277—207, 209